(12) United States Patent
Arimitsu et al.

(10) Patent No.: US 6,611,127 B2
(45) Date of Patent: Aug. 26, 2003

(54) DRIVE CIRCUIT FOR MOTOR/GENERATOR

(75) Inventors: Minoru Arimitsu, Yokosuka (JP);
Masaki Nakano, Yokohama (JP);
Yuusuke Minagawa, Yokosuka (JP);
Koji Takahashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/898,095

(22) Filed: Jul. 5, 2001

(65) Prior Publication Data

US 2002/0017892 A1 Feb. 14, 2002

(30) Foreign Application Priority Data

Aug. 7, 2000 (JP) ........................................ 2000-238105

(51) Int. Cl.$^7$ ................................. H02P 5/34; H02P 7/42
(52) U.S. Cl. ..................... 318/801; 318/139; 318/254; 318/432; 318/434; 318/800; 318/811; 318/151; 318/152; 318/153
(58) Field of Search .................. 318/139, 254, 318/432, 434, 801, 148, 151, 152, 153, 811; 363/60; 322/14, 16, 19, 28; 290/40, 45

(56) References Cited

U.S. PATENT DOCUMENTS

| | | | |
|---|---|---|---|
| 3,789,281 A | * 1/1974 | Shibata | 318/696 |
| 4,855,652 A | * 8/1989 | Yamashita et al. | 318/268 |
| 5,363,028 A | * 11/1994 | Mori | 318/599 |
| 6,034,511 A | * 3/2000 | Scott et al. | 322/46 |
| 6,060,859 A | * 5/2000 | Jonokuchi | 318/801 |
| 6,122,185 A | * 9/2000 | Utsunomiya et al. | 363/60 |
| 6,281,646 B1 | * 8/2001 | Masberg et al. | 318/139 |
| 6,335,606 B1 | * 1/2002 | Minagawa et al. | 318/801 |
| 6,384,567 B1 | * 5/2002 | Maeda | 318/801 |
| 6,472,845 B2 | * 10/2002 | Minagawa et al. | 318/801 |

FOREIGN PATENT DOCUMENTS

| | | | | |
|---|---|---|---|---|
| EP | 1087501 | * | 9/2000 | H02K/17/02 |
| EP | 1199210 A2 | * | 9/2001 | B60L/11/18 |
| JP | 11-182275 | * | 7/1999 | F02D/29/02 |
| JP | 11-275826 | * | 10/1999 | H02K/16/02 |
| JP | 2002-125393 | * | 4/2002 | H02P/7/74 |
| JP | 2002-125394 | * | 4/2002 | H02P/7/74 |
| JP | 2002-136169 | * | 5/2002 | H02P/6/08 |

* cited by examiner

Primary Examiner—Robert E. Nappi
Assistant Examiner—Tyrone Smith
(74) Attorney, Agent, or Firm—Foley & Lardner

(57) ABSTRACT

A drive circuit for a motor/generator, having a first rotating electrical machine which is mainly used as a motor and a second rotating electrical machine which is mainly used as a generator, is characterized in that a booster circuit is disposed at a position where the current for rotating the first rotating electrical motor cancels out with the current generated by the second rotating electrical machine. In this manner, the booster circuit comprising small capacity elements can be used in the drive circuit for the motor/generator.

10 Claims, 8 Drawing Sheets

DRIVE CIRCUIT FOR MOTOR/GENERATOR

FIELD OF THE INVENTION

This invention relates to a drive circuit for a motor/generator.

BACKGROUND OF THE INVENTION

Tokkai-Hei-11-275826 published by the Japanese Patent Office in 1999 discloses a motor/generator provided with a plurality of rotating electrical machines which are controlled by a single inverter.

SUMMARY OF THE INVENTION

When a normal inverter is used in the above type of motor/generator, the inverter must supply a current to the plurality of rotating electrical machines and therefore the problem has arisen that a high-voltage power source must be provided. It has been proposed to solve this problem by the provision of a booster circuit in the drive circuit of the motor/generator. However excessive current may be applied to the booster circuit when the position for the booster circuit is not suitably selected.

The present invention has the object of providing a drive circuit for a motor/generator comprising a booster circuit to which excessive current is not applied.

In order to achieve above object, this invention provides a drive circuit for a motor/generator, having an inverter and a direct current power source supplying electrical power to the inverter, the motor/generator being driven by the inverter and having a first rotating electrical machine which mainly functions as a motor and a second rotating electrical machine which mainly functions as a generator.

The drive circuit comprising a booster circuit for boosting a voltage of the direct current power source, the booster circuit is disposed at a position where a current for rotating the first rotating electrical motor cancels out with a current generated by the second rotating electrical machine.

The details as well as other features and advantages of this invention are set forth in the remainder of the specification and are shown in the accompanying drawings.

DESCRIPTION OF THE PREFERRED EMBODIMENTS

Figure 1:
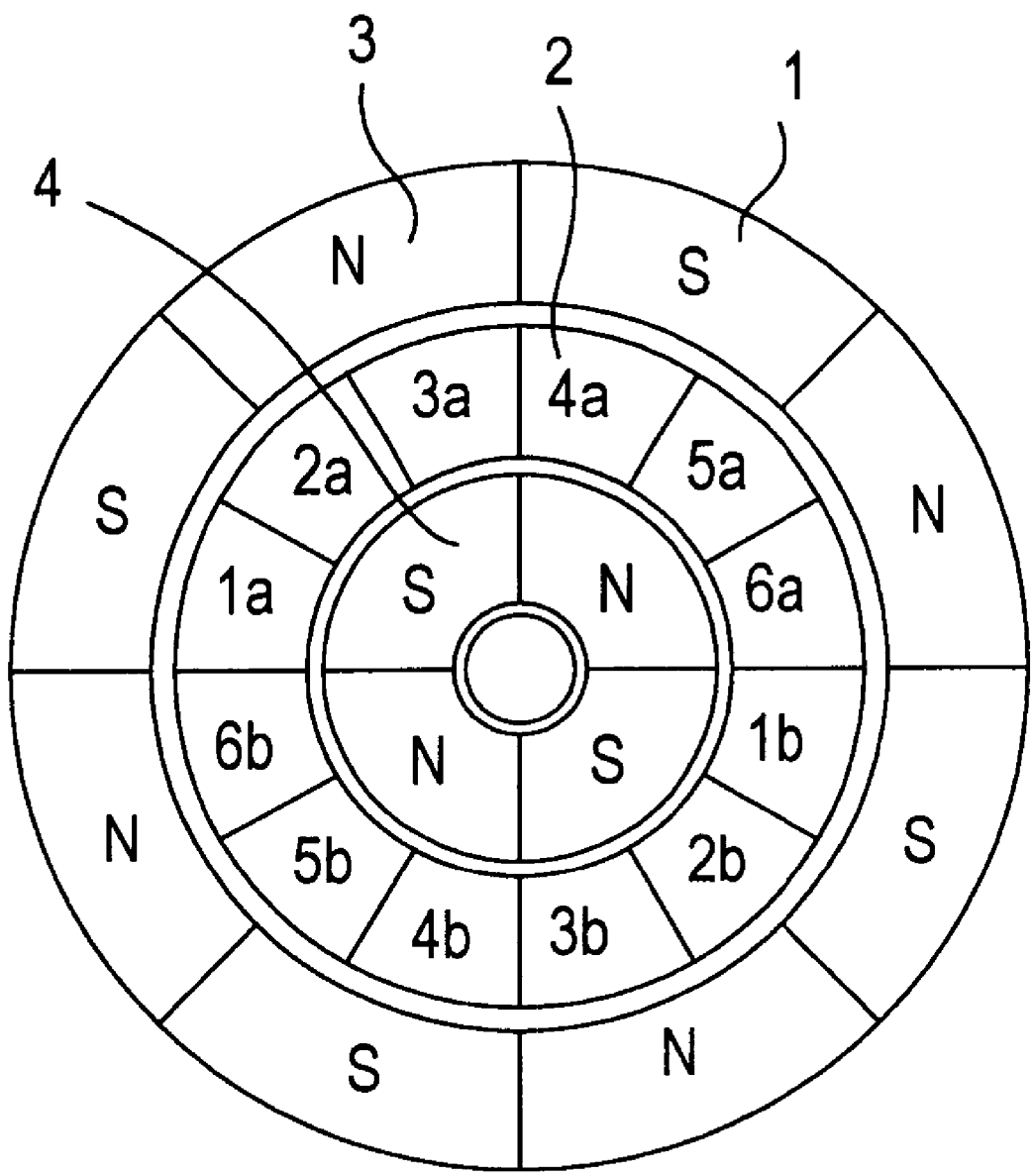
FIG. 1 is a schematic sectional view of a motor/generator in a preferred embodiment according to the present invention.
Figure 2:
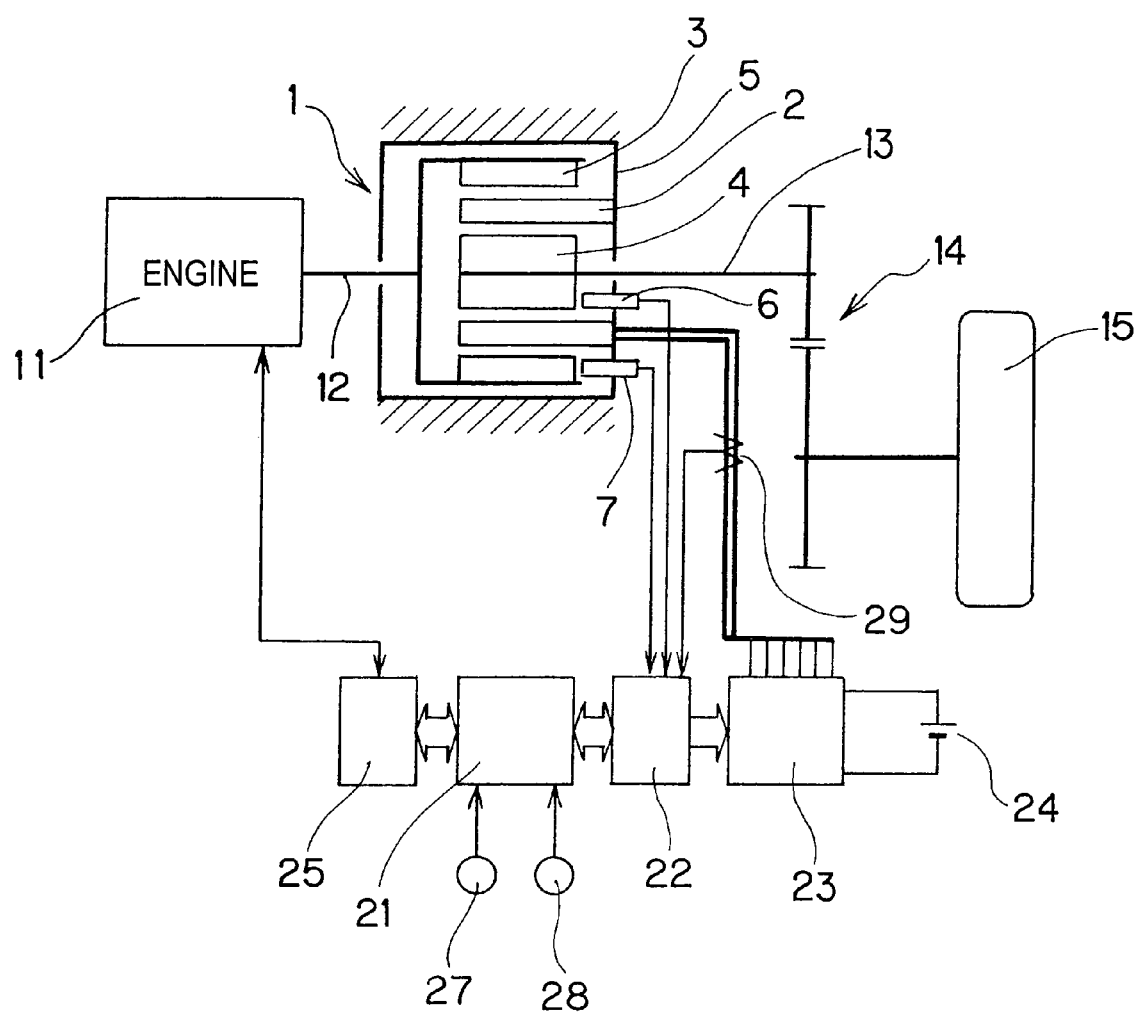
FIG. 2 is a schematic diagram of a hybrid system for a vehicle applying the present invention.

A motor/generator applying the present invention will be described below referring to FIG. 1. The motor/generator comprises two rotating electrical machines which use a common stator. The motor/generator has a three-layered structure, being provided with a cylindrical stator 2, and rotors 3, 4 disposed with a fixed clearance on an inner side and an outer side of the cylindrical stator 2. Referring now to FIG. 2, the inner and outer rotors 3, 4 are provided coaxially to one another and can rotate with respect to an outer frame 5 which covers the entire motor/generator.

To describe this in further detail, the inner rotor 4 is provided with permanent magnets disposed so that the N poles and the S poles alternate every 90 degrees. There are respectively two N poles and S poles in the inner rotor 4. On the other hand, the outer rotor 3 is provided with permanent magnets which are disposed so that the N poles and S poles alternate every 45 degrees. There are respectively four N poles and S poles in the outer rotor 3.

The stator 2 comprises three coils 8 for each magnetic pole of the inner rotor 4, thus disposing a total of twelve (=3×4) coils 8 (#1a-#6a, #1b-#6b) at equal angular intervals on the same circular periphery. In order to facilitate the description, numbers are assigned to the twelve coils as shown in FIG. 1. In order to contrast these numbers from the member numerals, the symbol # will be added before the numeral as in the example coil #6a when describing coil numbers in the description hereafter.

In order to generate a first rotating magnetic field in the inner rotor 4, groups of six coils are formed with the twelve coils, that is to say, (#1a-#6a, #1b-#6b), and a six-phase alternating current (Ia, Ib, Ic, Id, Ie, If) is applied to the groups of six coils with a phase deviating every 60 degrees. In order to generate a second rotating magnetic field in the outer rotor 3, groups of three coils are formed with the twelve coils, that is to say, (#1a, #2a, #3a), (#4a, #5a, #6a), (#1b, #2b, #3b), (#4b, #5b, #6b), and a three-phase alternating current (Iu, Iv, Iw) is applied to the groups of three coils with a phase deviating every 120 degrees.

In this manner, the six-phase alternating current and the three-phase alternating current is combined into a current (hereafter referred to as a composite current). The composite current is applied to the twelve coils. The current which flows in the coils designated with numbers with "b" is the same as the current which flows in the coils designated with numbers with "a".

When the current is constituted in this manner, the first rotating magnetic field for rotating the inner rotor 4 and the second magnetic field for rotating the outer rotor 3 are generated at the same time in a single coil. A first rotating electrical machine comprising the inner rotor 4 and the stator 2, and the second rotating electrical machine comprising the outer rotor 3 and the stator 2, can be controlled independently. That is to say, a rotational force is not applied to the magnets of the inner rotor 4 as a result of the second rotating magnetic field to rotate the outer rotor 3. Furthermore a rotational force is not applied to the magnets of the outer rotor 3 as a result of the first rotating magnetic field to rotate the inner rotor 4. This principle is disclosed in the above-mentioned Tokkai-Hei-11-4275826.

The six-phase alternating current (Ia, Ib, Ic, Id, Ie, If) is synchronized to the rotation of the inner rotor 4 and the three-phase alternating current (Iu, Iv, Iw) is synchronized to the rotation of the outer rotor 3. Advancing or delaying the phase with respect to the direction of torque is set in the same manner as a synchronous motor.

Referring to FIG. 2, a hybrid system for a vehicle applying a motor/generator drive circuit according to the present invention will be described.

The motor/generator 1 is combined with an engine 11. The outer rotor 3 is directly combined to the output shaft 12 of the engine 11 and the inner rotor 4 is directly connected to the drive shaft 13. The drive shaft 13 is connected to the drive wheels 15 of the vehicle through a reduction gear 14.

Figure 3:
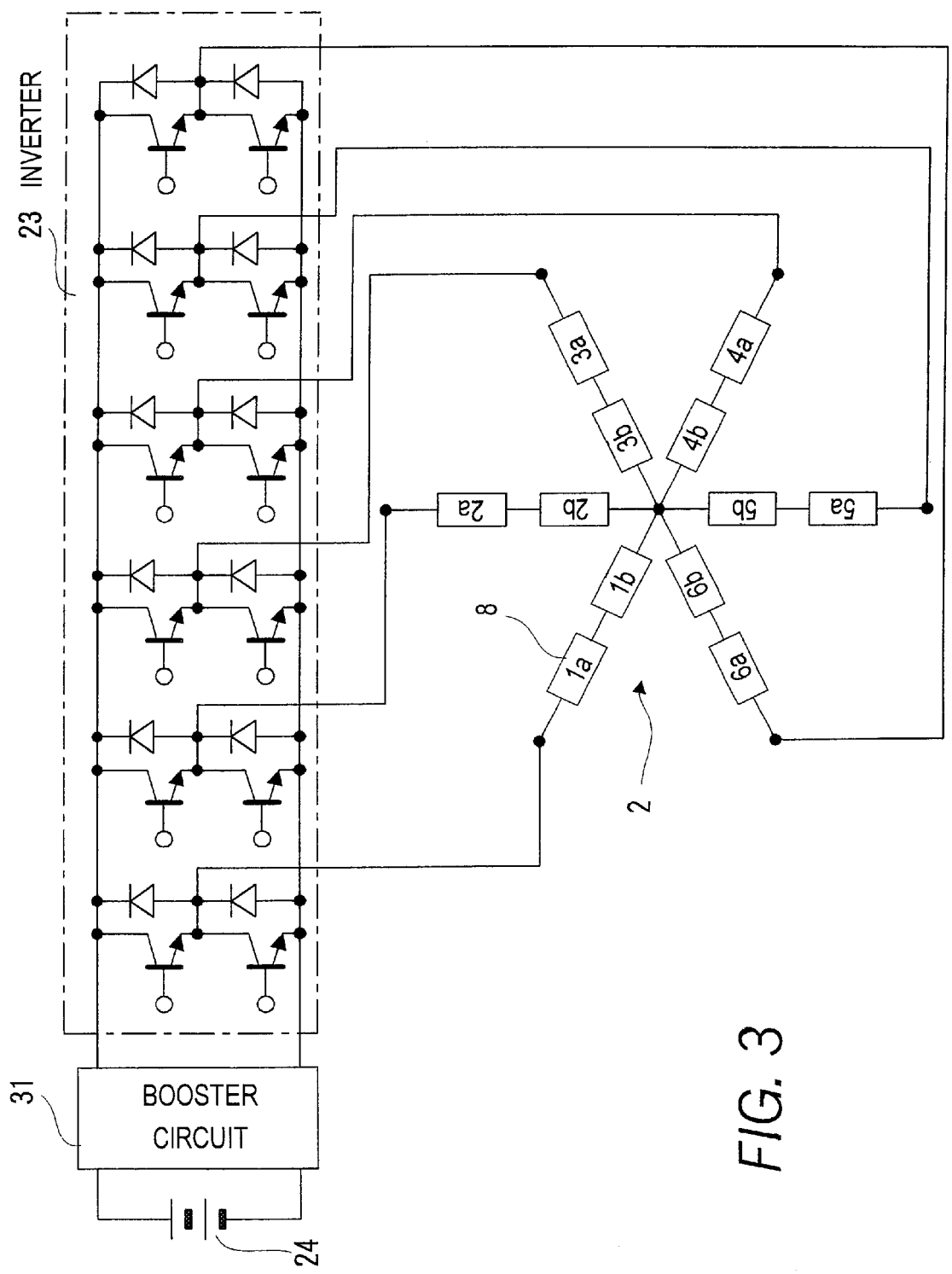
FIG. 3 is a schematic circuit diagram of a drive circuit for a motor/generator embodying the present invention.

The hybrid system is provided with an inverter 23 which converts the direct current from a battery (i.e. direct current power source) 24 to an alternating current to supply the composite current to the twelve stator coils. Referring now to FIG. 3, the inverter 23 is similar to a normal three-phase bridge type inverter, but is a six-phase inverter. The inverter 23 comprises twelve transistors and an equal number of diodes. Since it is possible to perform a serial connection on coils which have the same current applied, a six-phase inverter, not a twelve-phase inverter, can be used.

The ON-OFF signal which is applied to each gate of the inverter 23, that is to say, to the base of each transistor is a pulse width modulation (PWM) signal. As shown in FIG. 2, two rotation angle sensors 6, 7 are provided to detect the respective phases of rotors 3, 4, so that the outer rotor 3 and the inner rotor 4 are rotated in synchronization with the three-phase current and the six-phase current, respectively. Signals from the sensors 6, 7 are input into a microprocessor-based motor controller 22. The motor controller 22 generates a PWM signal based on the target torques (which take both negative and positive values) for the outer rotor 3 and the inner rotor 4.

The first rotating electrical machine having the inner rotor 4 functions mainly as a motor and the second rotating electrical machine having the outer rotor 3 functions mainly as a generator. The electrical power which is output from the battery 24 corresponds to the difference of the power consumed by the first rotating electrical machine (hereafter referred to as "vehicle drive output") and the power generated by the second rotating electrical machine.

Figure 4:
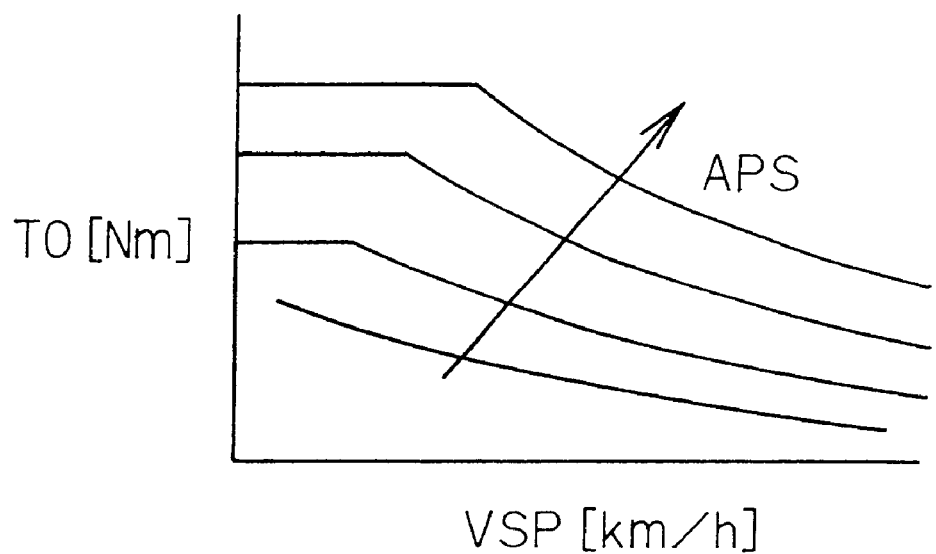
FIG. 4 is a map specifying the relationship of the target drive torque and the vehicle speed.

The integrated controller 21 comprises a microprocessor which is provided with a central processing unit (CPU), a read only memory (ROM), a random access memory (RAM) and an input/output interface (I/O interface). The integrated controller 21 calculates a target drive torque To which represents the target torque of the vehicle drive shaft 13 based on a first map as shown in FIG. 4. The calculation is based on an accelerator pedal depression amount APS from an output signal of an accelerator depression amount sensor 27, and a vehicle speed VSP from an output signal of a vehicle speed sensor 28. Furthermore the integrated controller 21 calculates a rotation speed Nm of the drive shaft 13 from a reduction ratio of the reduction gear 14, the vehicle speed VSP, and the radius of the drive wheels 15.

Figure 5:
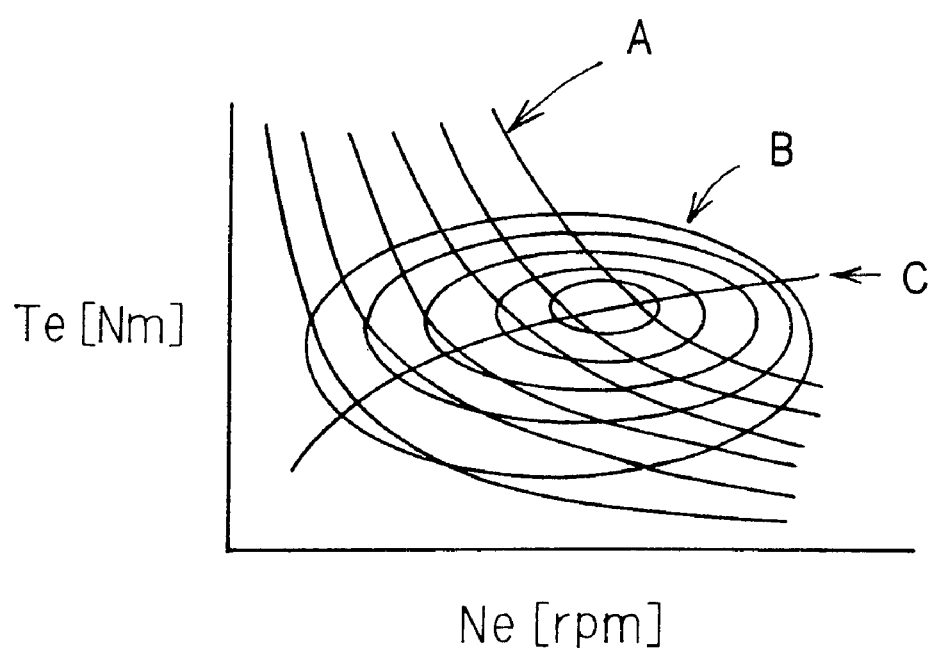
FIG. 5 is a map used in determination of target engine torque and target engine rotation speed.

The integrated controller 21 calculates a target engine torque Te and a target engine rotation speed Ne based on a second map as shown in FIG. 5 so that engine 11 generates an output which is approximately equal to a vehicle drive output with maximum fuel economy. The vehicle drive output is obtained from the product of the target drive torque TO and rotation speed Nm of the drive shaft 13. In FIG. 5, the letter A designates the isovalue curves for engine output, and B shows isovalue curves for fuel efficiency. On the curve C, the engine 11 operates at maximum fuel efficiency.

Since the outer rotor 3 is directly connected to the output shaft 12 of the engine 11, the target rotation speed Ng of the second rotating electrical machine and the target torque Tg of the second rotating electrical machine are respectively equal to the target engine rotation speed Ne and the target engine torque Te. The generated electrical power of the second rotating electrical machine is approximately equal to the output of the engine 11. In the same manner, the target torque Tm of the first rotation electrical machine is equal to the target drive torque TO.

After the target torque Tm of the first rotating electrical machine and the target rotation speed Ng and target torque Tg of the second rotating electrical machine are determined by the integrated controller 21 as described above, the motor controller 22 performs the following control routine.

The motor controller 22 determines a command value for the d-axis current and a command value for the q-axis current for each rotating electrical machine, using known vector control method. The motor controller 22 calculates an actual d-axis current and q-axis current from the output signal of the outer rotor rotation angle sensor 7, the output signal of the inner rotor rotation angle sensor 6, and the detection signal of a current sensor 29.

After calculating d-axis and q-axis correction values to make the actual d-axis current and the actual current coincide with the d-axis current and the q-axis command values respectively, the motor controller 22 calculates voltage command values for a three and six-phase alternating current, by performing 2-phase to 3-phase coordinate transformation and 2-phase to 6-phase coordinate transformation on the correction values.

After the voltage command values for a three and six-phase alternating current are combined into a composite voltage command value, the motor controller 22 generates a PWM signal from the composite voltage command value and the carrier signal, for supplying the PWM signal to the inverter 23.

On the other hand, the microprocessor-based engine controller 25 controls the fuel injection amount, the ignition timing, and the air intake amount so that the rotation speed and the torque of the engine 11 coincide with the target rotation speed Ne and the target engine target Te, respectively.

The drive circuit of the motor/generator according to the present invention will be described below in detail.

Although it is possible to dispose a booster circuit at various positions in a drive circuit of a motor/generator, the booster circuit 31 according to this invention is disposed at a position where the current for operating the first electrical rotating machine provided with the inner rotor 4 as a motor cancels out with the current generated by the second electrical rotating machine provided with the outer rotor 3. In this manner, it is possible to use small capacity elements for the booster circuit 31.

In the present embodiment, the booster circuit 31 is disposed between the battery (direct current power source) 24 and the inverter 23, as shown in FIG. 3.

Figure 6:
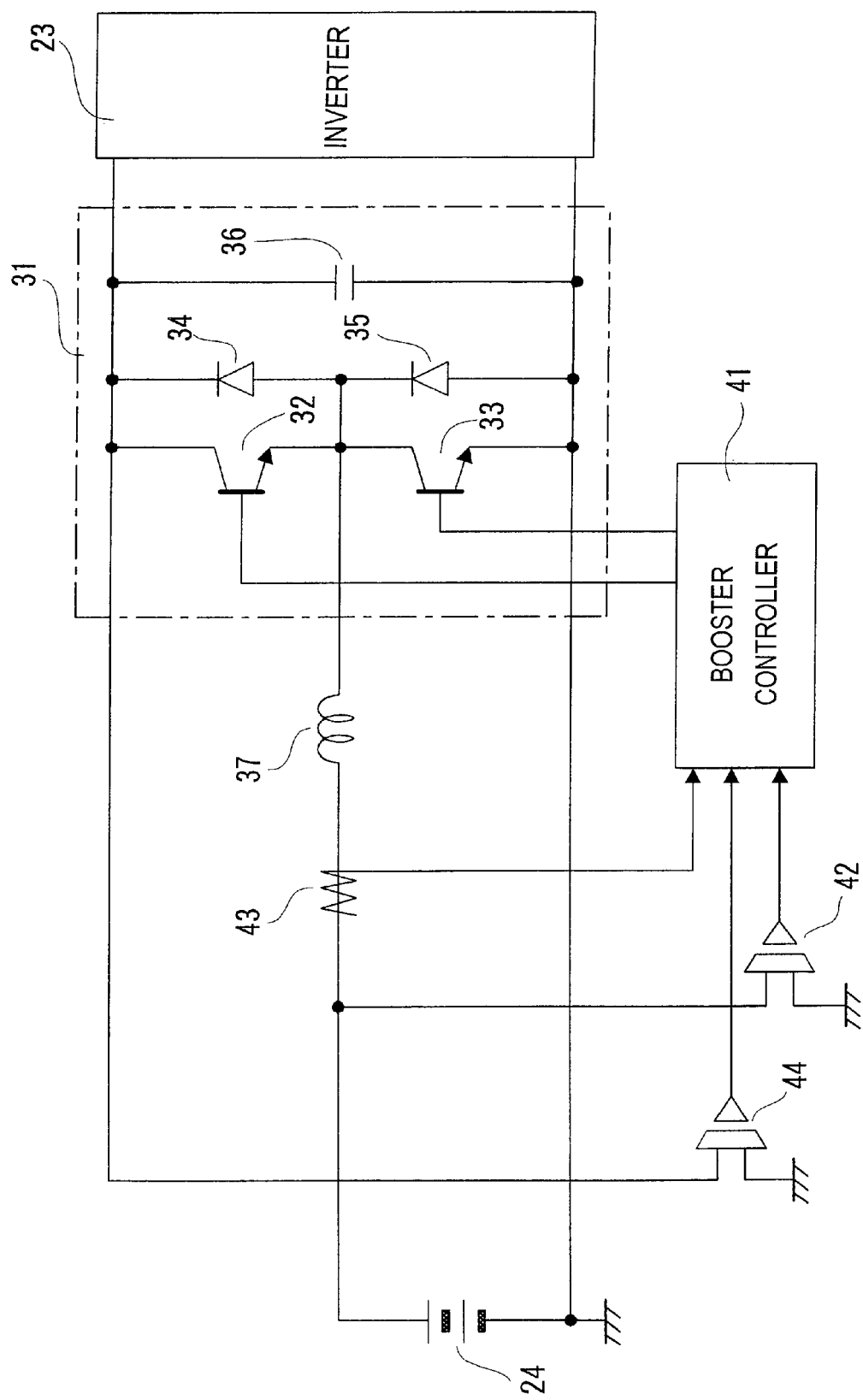
FIG. 6 is a schematic diagram of a booster circuit according to the present invention.

Referring now to FIG. 6, the booster circuit 31 comprises a first switching power device 32, for example an NPN transistor, connected to a plus side of the battery, a second switching power device 33 connected to a minus side of the battery, diodes 34, 35 each being connected through an anti-parallel connection to each switching power device 32, 33, and a condenser 36 being connected to both ends of the two serially connected switching power devices 32, 33. The plus terminal of the battery 24 is connected to the junction point of the two switching power devices 32, 33 through a coil 37. The minus terminal of the battery 24 is connected to the emitter of the second switching power device 33. The coil 37 connected to the plus terminal of the battery 24 has a saturable impedance which becomes saturated in high power regions or high current regions.

The ON-OFF signals applied to the two switching power devices 32, 33 are PWM signals. A battery voltage sensor 42 for detecting the voltage of the battery 24, a battery current sensor 43 for detecting the current of the battery 24, and an inverter voltage sensor 44 for detecting a DC voltage applied to the inverter 23 are provided in order to boost the DC voltage applied to the inverter 23 to a required DC voltage. The required DC voltage is adapted to exceed the peak value of the composite voltage command value.

A booster controller 41 comprises a microprocessor which is provided with a central processing unit (CPU), a read only memory (ROM), a random access memory (RAM) and an input/output interface (I/O interface). Signals from the sensors 42, 43, 44 are input into the booster controller 41.

The booster controller 41 controls a duty ratio of the PWM signal which is applied to the two switching power devices 32, 33 so that the DC voltage of the inverter 23 detected by the inverter voltage sensor 44 coincides with the required DC voltage. The two switching power devices 32, 33 are used in such a manner that the two switching power devices 32, 33 do not pass a current at the same time. When the DC voltage of the inverter 23 is higher than the required DC voltage, the booster controller 41 only operates the first switching power device 32. At this time, the second switching power device 33 is not operated. Conversely, when the DC voltage of the inverter 23 is lower than the required DC voltage, the booster controller 41 only operates the second switching power device 33. At this time, the first switching power device 32 is not operated.

Figure 7:
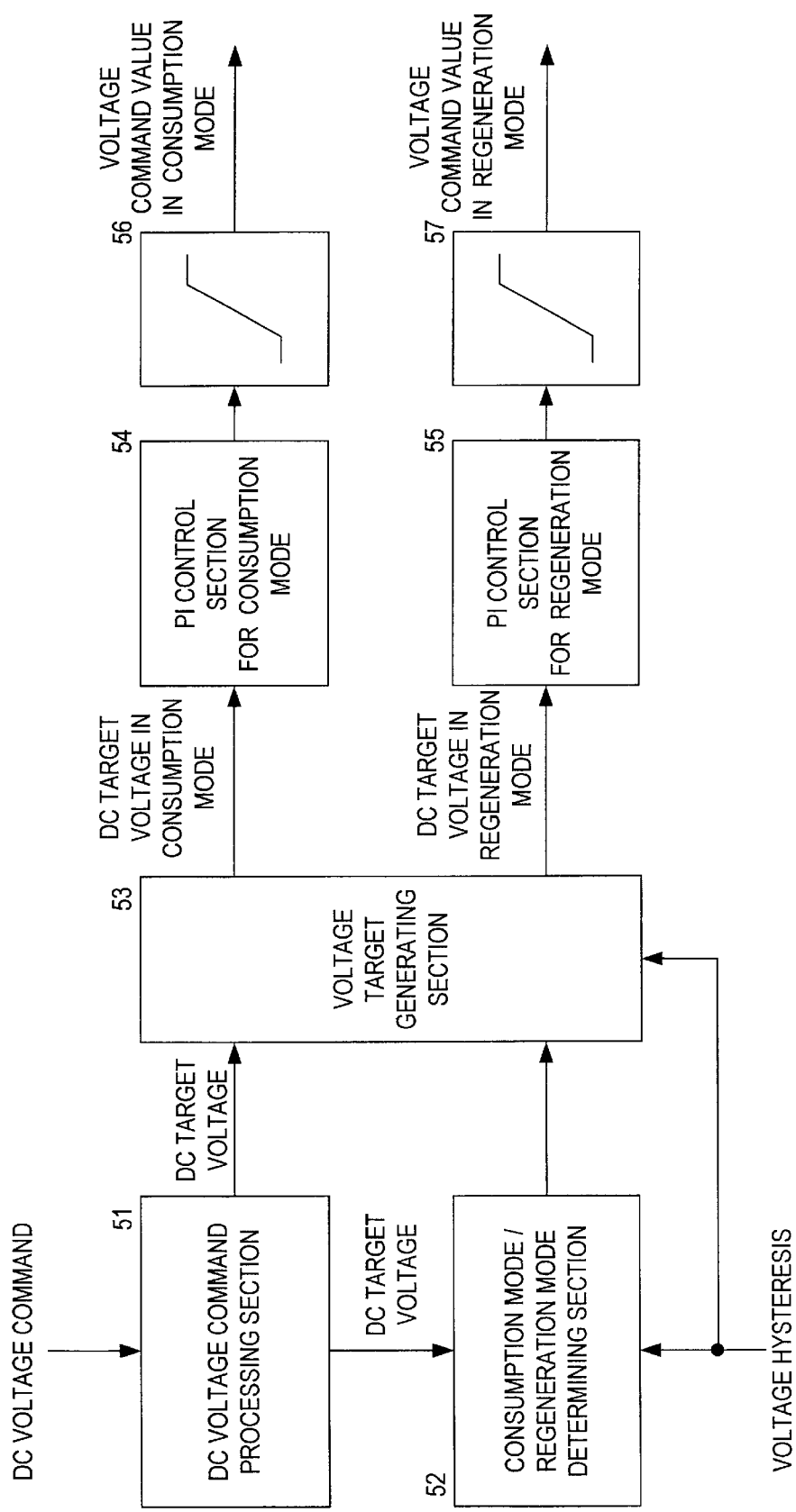
FIG. 7 is a block diagram describing control by a booster controller according to the present invention.

The booster controller 41 is provided with process sections as shown in FIG. 7 in order to execute the control routine described above. These process sections are virtual units constructed from the functions of the CPU, ROM and RAM in the booster controller 41.

A control routine performed by the booster controller 41 will be described in detail below with reference to the control block diagram shown in FIG. 7.

The booster controller 41 comprises a DC voltage command processing section 51, a determining section 52, a voltage target generating section 53, a first PI control section 54, a second PI control section 55, a first limiter 56, and a second limiter 57.

The DC voltage command processing section 51 receives the DC voltage command as a required DC voltage and varies the DC voltage command to the DC target voltage. The determining section 52 determines whether the operating mode of the motor/generator is power consumption mode or power regeneration mode. Power consumption mode is an operating mode in which electrical power from the battery 24 is output to the motor/generator. Power regeneration mode is an operating mode in which electrical power is returned to the battery 24 from the motor/generator.

The determining section 52 determines that the operating mode is power consumption mode for example when the consumed power of the rotating electrical machine which is operated as a motor is greater than the generated electrical power of the rotating electrical machine which is operated as a generator. Conversely, when the generated electrical power of the rotating electrical machine which is operated as a generator is greater than the consumed electrical power of the rotating electrical machine which is operated as a motor, it is determined that the operating mode is power regeneration mode.

The voltage target generation section 53 generates a voltage target value in power regeneration mode and power consumption mode based on the result from the determining section 52 and the DC target voltage. The first PI control section 54 performs proportional-plus-integral (PI) control in order to achieve a voltage target value in power consumption mode. The second PI control section 55 performs proportional-plus-integral control in order to achieve a voltage target value in power regeneration mode. The first limiter 56 limits the voltage command value from the first PI control section 54 to a first upper limit. The second limiter 57 limits the voltage command value from the second PI control section 55 to a second upper limit.

The switching power devices 32, 33 of the booster circuit 31 are turned ON or OFF in response to a voltage command value (duty signal) determined by the booster controller 41 as shown above.

The effect of the present embodiment will be described below. In the following description, it is assumed that the first rotating machine provided with the inner rotor 4 operates as a motor and the second rotating machine provided with the outer rotor 3 operates as a generator. As a result, only a current which corresponds to the difference of the generated power from the second rotating electrical machine and the output to the first rotating electrical machine flows at the position where the booster circuit 31 is disposed. That is to say, the current flows in the DC bus lines between the battery 24 and the switching circuit of the inverter 23. As a result, it is possible to reduce the capacity of the switching power devices 32, 33 and diodes 34, 35 comprising the booster circuit 31.

Furthermore a coil whose impedance is saturated with a relatively small current can be used, as the coil 37, in accordance with the booster circuit 31 which can comprise small capacity elements.

Figure 8:
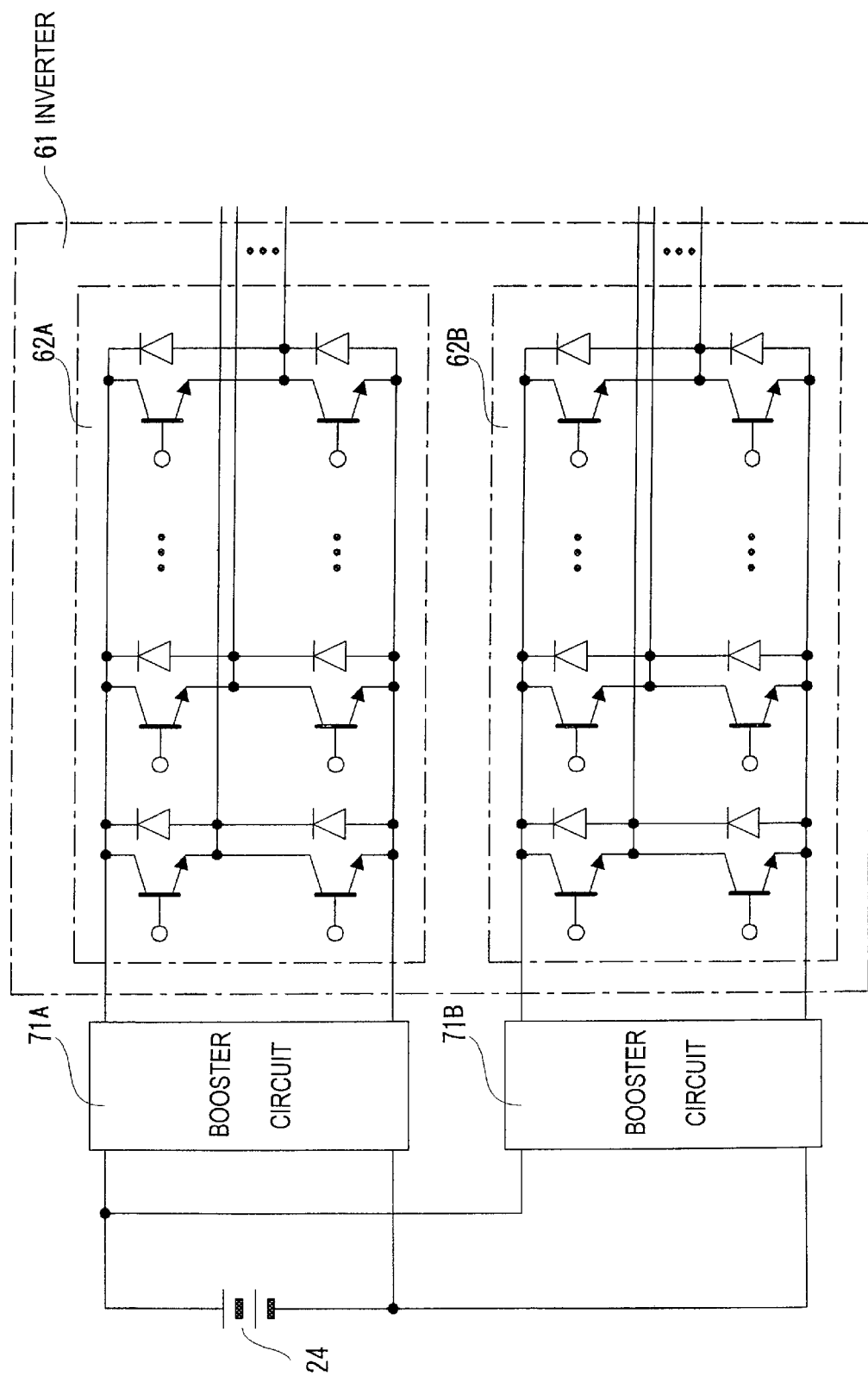
FIG. 8 is similar to FIG. 3, however shows a schematic diagram of a drive circuit for a motor/generator according to a second embodiment of the present invention.
Figure 9:
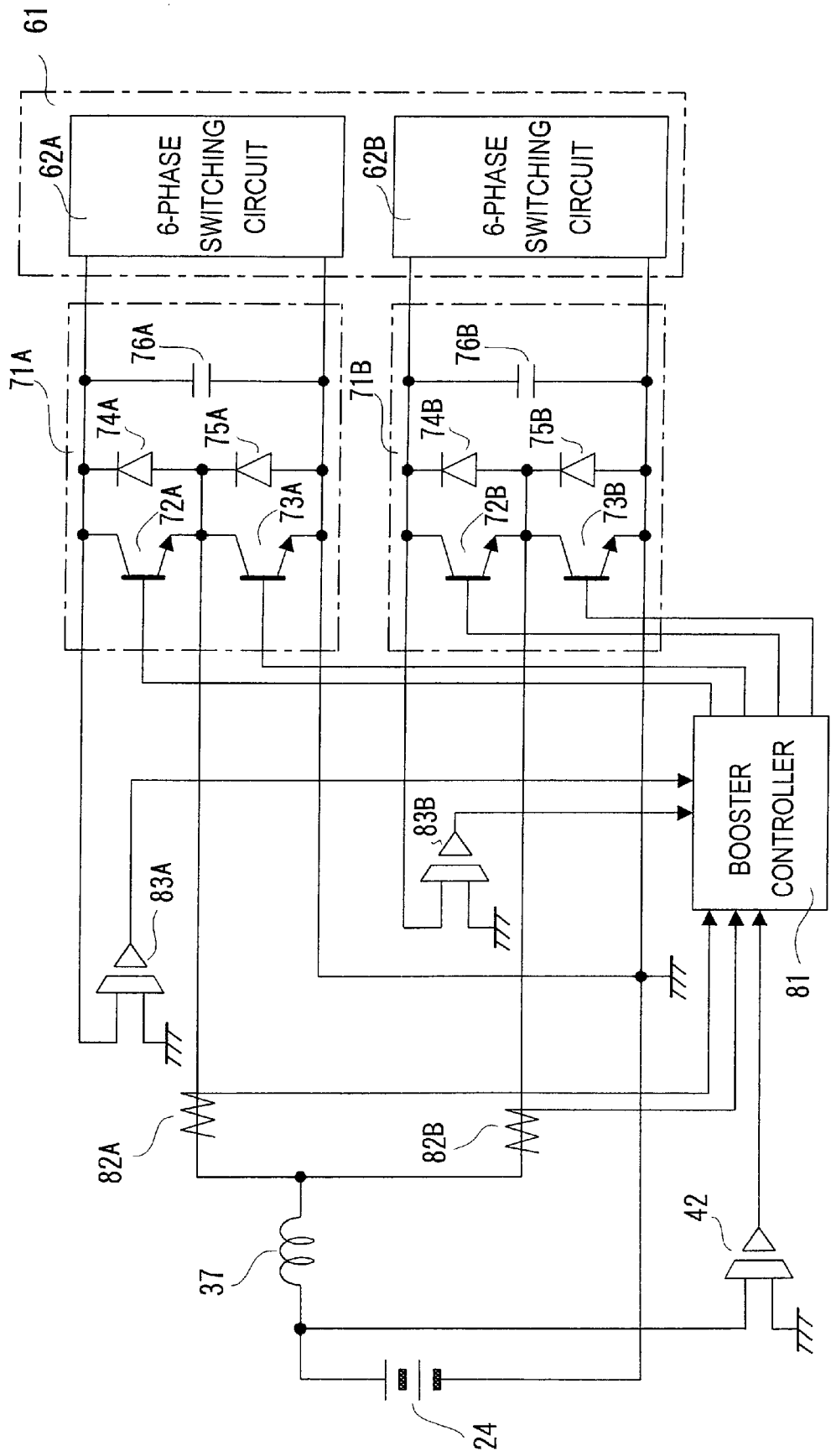
FIG. 9 is similar to FIG. 6, however shows a schematic diagram of a booster circuit according to a second embodiment.

The drive circuit of the motor/generator according to a second embodiment will be described with reference to FIG. 8 and FIG. 9.

In the first embodiment above, a 6-phase inverter is connected to a single stator. However in the second embodiment, a 12-phase inverter is connected to a single stator. The 12-phase inverter comprises two switching circuits 62A, 62B each provided with a booster circuit 71A, 71B.

However the basic structure of the sensor detecting the voltage/current and each booster circuit does not differ from that described with reference to the first embodiment. That is to say, one booster circuit 71A is provided with two switching power devices 72A, 73A, two diodes 74A, 75A and a condenser 76A. The other booster circuit 71B is provided with two switching power devices 72B, 73B, two diodes 74B, 75B and a condenser 76B.

The following signals are input to a booster controller 81. A signal is input from a sensor 83A which detects the DC voltage of the first 6-phase switching circuit 62A. A signal is input from a sensor 83B which detects the DC voltage of the second 6-phase switching circuit 62B. A signal is input from a sensor 82A which detects a current from the battery 24 to the first booster circuit 71A. A signal is input from a sensor 82B which detects a current to the second booster circuit 71B. A signal is input from a sensor 42 which detects voltage of the battery 24.

The voltage applied to the first 6-phase switching circuit 62A is boosted to a target voltage by controlling a duty ratio of a PWM signal applied to the two switching power devices 72A, 73A so that the DC voltage detected by the sensor 83A coincides with a required DC voltage. In the same manner, the voltage applied to the second 6-phase switching circuit 62B is increased to a target voltage by controlling a duty ratio of a PWM signal applied to the two switching power devices 72B, 73B so that the DC voltage detected by the sensor 83B coincides with a required DC voltage. That is to say, in the second embodiment, the first and second 6-phase switching circuits 62A, 62B are controlled independently.

Apart from the fact that the same effect is obtained as that described with reference to the first embodiment, the second embodiment also obtains the following effect. Since the two booster circuits 71A, 71B are disposed in parallel, when either one of the booster circuits malfunctions, the motor/generator can be operated by using the other booster circuit and the 6-phase switching circuit connected to the other booster circuit.

The entire contents of Japanese Patent Applications P2000-238105 (filed Aug. 7, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A drive circuit for a motor/generator, having an inverter and a direct current power source supplying electrical power to the inverter, the motor/generator being driven by the inverter and having a first rotating electrical machine which mainly functions as a motor and a second rotating electrical machine which mainly functions as a generator, the drive circuit comprising:

a booster circuit for boosting a voltage of the direct current power source, the booster circuit comprising a first switching power device connected to a plus side of the direct current power source, a second switching power device connected between a minus side of the direct current power source and the first switching power device, a diode connected through an anti-parallel connection to the first and second switching power devices, and a condenser connected to both ends of the first and second power devices, wherein the booster circuit is disposed at a position where a current for rotating the first rotating electrical motor cancels out with a current generated by the second rotating electrical machine.

2. The drive circuit for a motor/generator as defined in claim 1, wherein the booster circuit is provided for each switching circuit when the inverter has a plurality of switching circuits connected in parallel.

3. The drive circuit for a motor/generator as defined in claim 1, wherein the booster circuit is disposed between the inverter and the direct current power source.

4. The drive circuit for a motor/generator as defined in claim 1 wherein a component which has a saturable impedance and is saturated by a high current or a high voltage is interposed between the booster circuit and the direct current power source.

5. A drive circuit for a motor/generator, having an inverter and a direct current power source supplying electrical power to the inverter, the motor/generator being driven by the inverter and having a first rotating electrical machine which mainly functions as a motor and a second rotating electrical machine which mainly functions as a generator, the drive circuit comprising:

a sensor for detecting a direct current voltage applied to the inverter;

a booster circuit for boosting a voltage of the direct current power source, comprising a first switching power device connected to a plus side of the direct current power source, a second switching power device connected between a minus side of the direct current power source and the first switching power device, diodes each connected through an anti-parallel connection to each switching power device, and a condenser connected to both ends of the two power devices, wherein the booster circuit is disposed at a position where a current for rotating the first rotating electrical motor cancels out with a current generated by the second rotating electrical machine; and a microprocessor which controls the operation of the booster circuit, wherein the microprocessor is programmed to only operate the first switching power device and prohibit the second switching power device from operating, when the direct current voltage applied to the inverter is higher than a required direct current voltage.

6. A drive circuit for a motor/generator, having an inverter and a direct current power source supplying electrical power to the inverter, the motor/generator being driven by the inverter and having a first rotating electrical machine which mainly functions as a motor and a second rotating electrical machine which mainly functions as a generator, the drive circuit comprising:

a sensor for detecting a direct current voltage applied to the inverter;

a booster circuit for boosting a voltage of the direct current power source, comprising a first switching power device connected to a plus side of the direct current power source, a second switching power device connected between a minus side of the direct current power source and the first switching power device, diodes each connected through an anti-parallel connection to each switching power device, and a condenser connected to both ends of the two power devices, wherein the booster circuit is disposed at a position where a current for rotating the first rotating electrical motor cancels out with a current generated by the second rotating electrical machine; and a microprocessor which controls the operation of the booster circuit, wherein the microprocessor is programmed to only operate the second switching power device and prohibit the first switching power device from operating, when the direct current voltage applied to the inverter is lower than a required direct current voltage.

7. The drive circuit for a motor/generator as defined in claim 5, wherein the first switching power device is connected in series with the second switching power device; the inverter is connected in parallel with the first and second serially connected switching power devices; and the plus side of the direct current power source is connected to a connection point of the first and second switching power devices.

8. The drive circuit for a motor/generator as defined in claim 6, wherein the first switching power device is connected in series with the second switching power device; the inverter is connected in parallel with the first and second serially connected switching power devices; and the plus side of the direct current power source is connected to a connection point of the first and second switching power devices.

9. The drive circuit for a motor/generator as defined in claim 1, further comprising a microprocessor which controls an operation of the booster circuit, the microprocessor being programmed to:

determine whether an operating mode of the motor/generator is a power consumption mode in which electrical power from the direct current power source is output to the motor/generator or a power regeneration mode in which electrical power is returned to the direct current power source from the motor/generator;

calculate a voltage command value according to the operating mode of the motor/generator; and control a direct current voltage applied to the inverter by the booster circuit based on the calculated voltage command value.

10. The drive circuit for a motor/generator as defined in claim 1, wherein the first switching power device is connected in series with the second switching power device; the inverter is connected in parallel with the first and second serially connected switching power devices; and the plus side of the direct current power source is connected to a connection point of the first and second switching power devices.

* * * * *